(12) United States Patent
Catalano et al.

(10) Patent No.: US 10,121,027 B2
(45) Date of Patent: *Nov. 6, 2018

(54) DYNAMIC QUICK RESPONSE CODE BRANDING

(71) Applicant: International Business Machines Corporation, Armonk, NY (US)

(72) Inventors: Pasquale A. Catalano, Wallkill, NY (US); Andrew G. Crimmins, Montrose, NY (US); Arkadiy O. Tsfasman, Wappingers Falls, NY (US); John S. Werner, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/434,240

(22) Filed: Feb. 16, 2017

(65) Prior Publication Data
US 2018/0232544 A1 Aug. 16, 2018

(51) Int. Cl.
G06K 1/12 (2006.01)
G06K 19/06 (2006.01)

(52) U.S. Cl.
CPC ....... *G06K 1/121* (2013.01); *G06K 19/06037* (2013.01)

(58) Field of Classification Search
None
See application file for complete search history.

(56) References Cited

U.S. PATENT DOCUMENTS

| | | |
|---|---|---|
| 2003/0112298 A1 | 6/2003 | Sato et al. |
| 2009/0125143 A1 | 5/2009 | Bajocich et al. |
| 2014/0127738 A1 | 5/2014 | Lee et al. |
| 2015/0002880 A1 | 1/2015 | Hakamada |
| 2015/0118362 A1 | 4/2015 | Raczynski |
| 2015/0119238 A1 | 4/2015 | Pretsch et al. |

(Continued)

FOREIGN PATENT DOCUMENTS

| | | |
|---|---|---|
| DE | 2855981 A1 | 7/1979 |
| DE | 202004008559 U1 | 11/2004 |

(Continued)

OTHER PUBLICATIONS

Catalano et al., "Dynamic Quick Response Code Branding", U.S. Appl. No. 15/712,189, filed Sep. 22, 2017, 36 pages.

(Continued)

*Primary Examiner* — Kristy A Haupt
(74) *Attorney, Agent, or Firm* — Christopher K. McLane

(57) ABSTRACT

In an approach to managing a quick response code branding device and management of a quick response code branding device, one or more computer processors receive one or more quick response code configuration parameters. The one or more computer processors determine one or more program instructions corresponding to the one or more quick response code configuration parameters based on one or more task-specific factors. The one or more computer processors send the one or more program instructions to a quick response code branding device. The one or more computer processors receive quick response code branding device status data. The one or more computer processors determine whether the quick response code branding device status data meets the one or more quick response code configuration parameters.

20 Claims, 9 Drawing Sheets

(56) References Cited

U.S. PATENT DOCUMENTS

| | | |
|---|---|---|
| 2015/0161495 A1 | 6/2015 | Rodriguez et al. |
| 2016/0247054 A1 | 8/2016 | Sakahashi et al. |
| 2016/0304265 A1 | 10/2016 | Schoning |
| 2016/0350624 A1 | 12/2016 | Liguori et al. |
| 2017/0213117 A1 | 7/2017 | Kraus |

FOREIGN PATENT DOCUMENTS

| | | |
|---|---|---|
| EP | 75361 A1 | 3/1983 |
| WO | 2013001380 A2 | 1/2013 |
| WO | 2014182621 A1 | 11/2014 |
| WO | 2015054188 A1 | 4/2015 |

OTHER PUBLICATIONS

Catalano et al., "Dynamic Quick Response Code Branding ", U.S. Appl. No. 15/712,206, filed Sep. 22, 2017, 36 pages.

Appendix P, List of IBM Patents or Patent Applications Treated as Related, 2 pages, dated Sep. 29, 2017.

Catalano et al., "Dynamic Quick Response Code Branding", U.S. Appl. No. 15/812,152, filed Nov. 14, 2017, 36 pages.

Catalano et al., "Dynamic Quick Response Code Branding", U.S. Appl. No. 15/812,278, filed Nov. 14, 2017, 36 pages.

Appendix P, List of IBM Patents or Patent Applications Treated as Related, 2 pages, dated Nov. 20, 2017.

Yang et al., "Advanced Shape Memory Technology to Reshape Product Design, Manufacturing and Recycling", Polymers 2014, 6, 2287-2308; doi:10.3390/polym6082287, Open Access, ISSN 2073-4360, in revised form: Jul. 25, 2014 / Accepted: Aug. 12, 2014 / Published: Aug. 22, 2014.

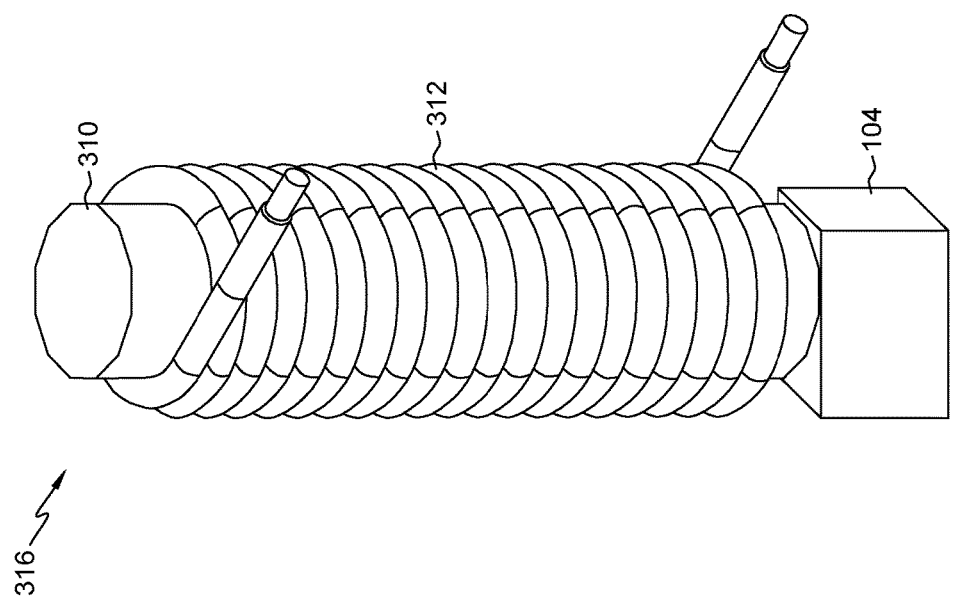

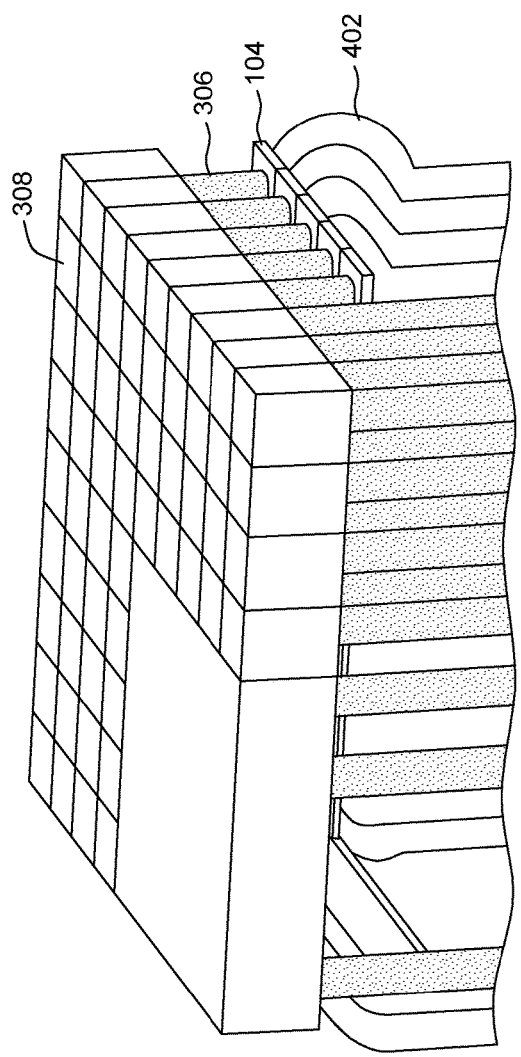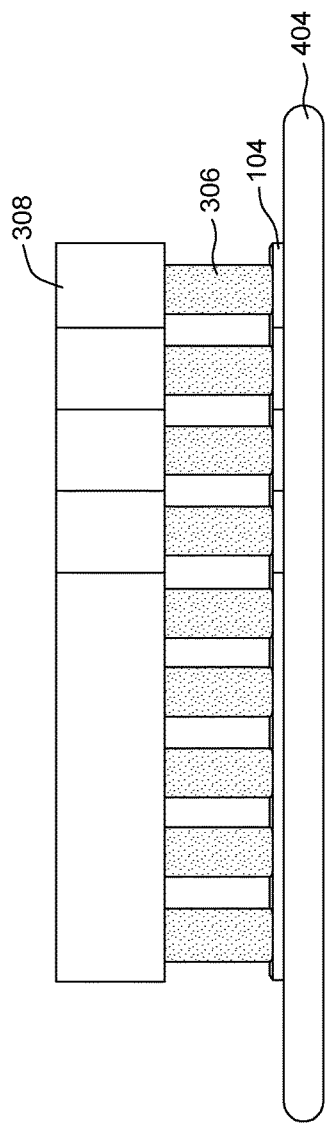
FIG. 4A
FIG. 4B

DYNAMIC QUICK RESPONSE CODE BRANDING

BACKGROUND OF THE INVENTION

The present invention relates generally to the field of matrix barcoding and more particularly to quick response code branding.

A quick response code is a two-dimensional barcode consisting of black and white modules arranged in either a square or rectangular matrix. The information to be encoded can be text or numeric data. The length of the encoded data depends on the number of cells in the matrix. Quick response code symbols are usually square in shape and composed of square cells which represent bits. Depending on the coding used, a "light" cell represents a 0 and a "dark" cell is a 1, or vice versa. Conventional quick response codes are composed of two solid adjacent borders in an "L" shape called the finder pattern and two borders opposite the adjacent borders consisting of alternating dark and light cells or modules called the timing pattern. Within these borders are rows and columns of cells encoding information. The finder pattern is used to locate and orient the symbol while the timing pattern provides a count of the number of rows and columns in the symbol. As more data is encoded in the symbol, the number of cells in rows and columns increases. The resulting symbol is unique.

Quick response codes storing addresses may appear in or on almost any object about which users might want information. Users with a device equipped with a camera or scanner equipped with a reader application can scan the image of the quick response code to execute program instructions to reveal information, such as a display text, contact information, connection to a wireless network, or a web page. This act of linking from physical world objects is referred to as hard linking or object hyperlinking. Quick response codes also may link to a location to track the geolocation of the scanned code.

SUMMARY

Embodiments of the present invention disclose an apparatus, a method, and a computer program product for a quick response code branding device and management of a quick response code branding device. The method includes one or more computer processors receiving one or more quick response code configuration parameters. The one or more computer processors determine one or more program instructions corresponding to the one or more quick response code configuration parameters based on one or more task-specific factors. The one or more computer processors send the one or more program instructions to a quick response code branding device. The one or more computer processors receive quick response code branding device status data. The one or more computer processors determine whether the quick response code branding device status data meets the one or more quick response code configuration parameters.

BRIEF DESCRIPTION OF THE DRAWINGS

FIG. 3C depicts an electromagnetic actuator assembly, in accordance with one embodiment of the present invention;

FIG. 4A depicts an inductive heat branding element, in accordance with one embodiment of the present invention;

FIG. 4B depicts a liquid nitrogen freeze branding element, in accordance with one embodiment of the present invention;

DETAILED DESCRIPTION

The fast paced autonomous nature of present day industries requires equally quick identification methods that allow for identification of one or more objects, such as products of manufacture, to be carried out efficiently and effectively. As such, applying dynamic quick response code (QR) branding to an apparatus capable of receiving and sending program instructions allows for a multitude of instructions and specifications to be seamlessly integrated into various industrial processes by allowing the rapid configuration of QR codes. For example, QR codes allow autonomous machines to extract information regarding manufacturing processes and specifications by reading QR codes labeled on different parts. In another example, QR codes allow for workers to quickly receive information regarding their tasks based on a specific configuration of a QR code and its link to an associated database of information. As technological progress spurs industry to adopt increasingly efficient methods of carrying out various tasks, dynamic QR coding allows for a seamless and constant communication of information to and between individuals and machines. Embodiments of the present invention recognize that dynamic QR code branding can increase the efficiency of information flow in industrial applications and allow for increased automation in technically complex applications. Implementation of embodiments of the invention may take a variety of forms, and exemplary implementation details are discussed subsequently with reference to the Figures.

Figure 1:
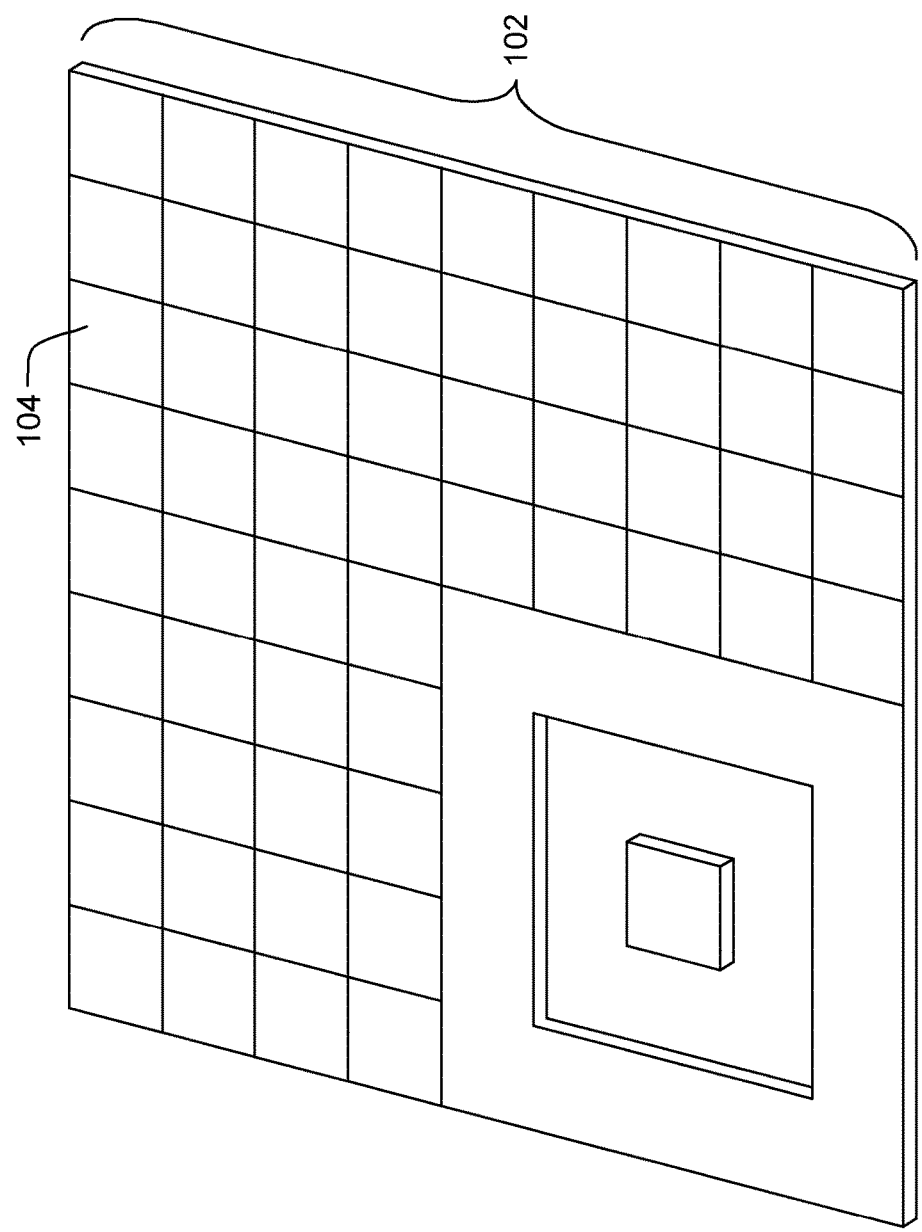
FIG. 1 depicts a quick response bit head assembly, in accordance with an embodiment of the present invention.

FIG. 1 depicts a QR bit head assembly, in accordance with an embodiment of the present invention. In this embodiment, QR bit head grid 102 comprises one or more QR bits 104 arranged in parallel which act as a conduit for branding QR codes onto various substrates. In one embodiment, QR bit 104 is adapted to receive electrical heating elements. In yet another embodiment, QR bit 104 is adapted to receive electromagnetic actuator elements. For example, electromagnetic actuator elements may be used for freeze branding applications to control the configuration of QR bits 104. In yet another embodiment, QR bit 104 is adapted to receive inductive heating elements. For example, QR bit 104 may contain ferrous materials allowing for QR bit 104 to receive inductive heating. In yet another embodiment, QR bit 104 may be adapted to receive resistive heating elements. For example, QR bit 104 may receive radiative energy transfer from a resistive heating element. QR bit 104 may take any variety of physical forms and configurations applicable to QR patterns. In another embodiment, QR bit head grid 102 may not comprise one or more QR bits 104 arrange in parallel. In another embodiment, QR bit head grid 102 may comprise a plurality of QR bits 104 of different sizes and shapes in association with actuator grid assembly 202 of FIG. 2, discussed below. For example, a QR code that does not require dynamic adaptation may be permanently formed into a unique QR bit 104, such as finder patterns. In another example, QR bits 104 may be shaped in such a way that potential thermal bleeding will not affect the readability of neighboring QR bits 104 to ensure that the result accurately reflects the QR code.

Figure 2:
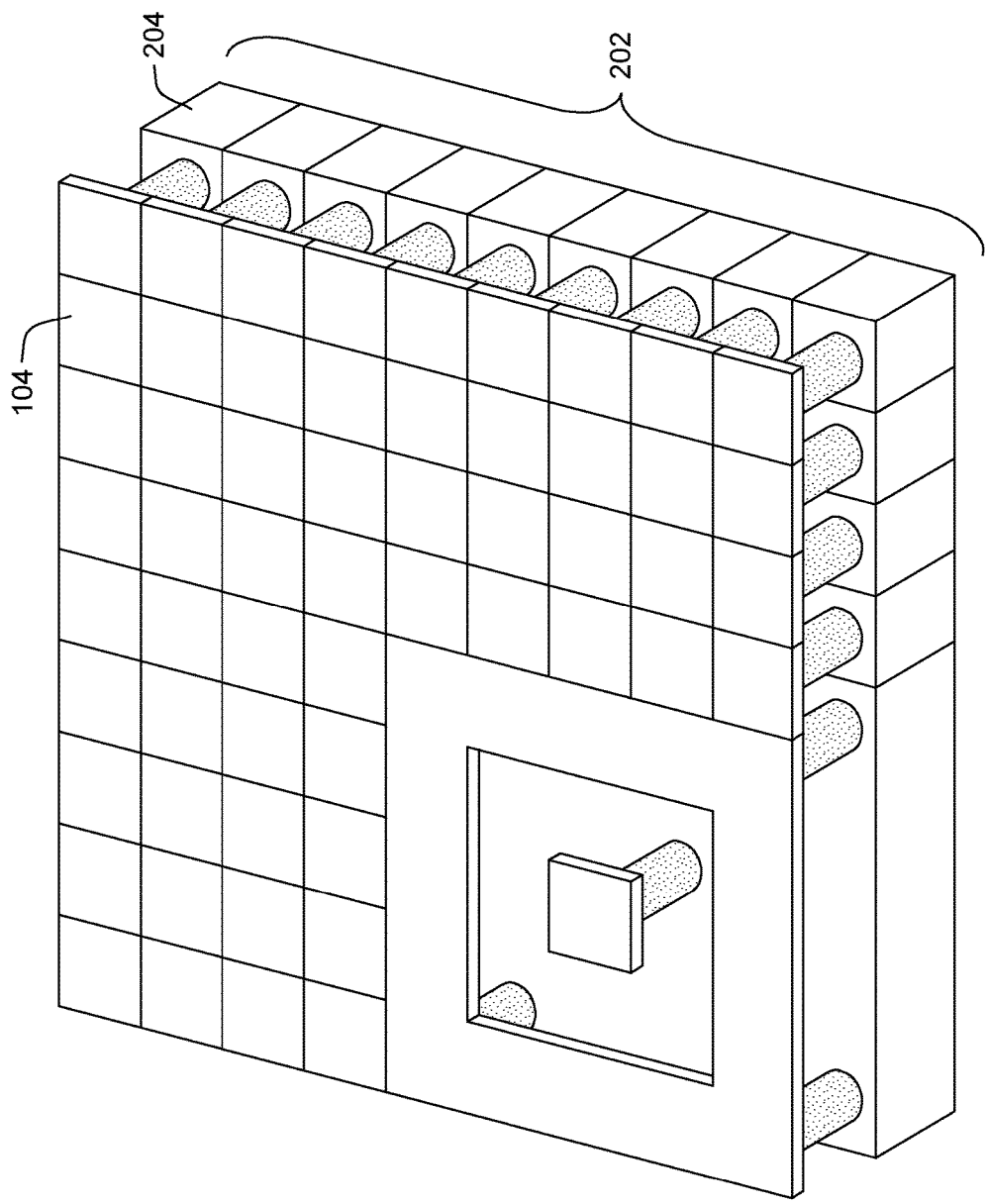
FIG. 2 depicts an actuator grid assembly associated with the quick response bit head assembly, in accordance with one embodiment of the present invention.

FIG. 2 depicts an actuator grid assembly associated with a QR bit head grid 102, in accordance with one embodiment of the present invention. In this embodiment, actuator grid assembly 202 comprises one or more actuators 204 arranged in parallel and adjacent with respect to each other and positioned adjacent to the posterior face of the QR bit head grid 102. In some embodiments, actuator grid assembly 202 may be permanently attached to one or more QR bits 104. In other embodiments, actuators 204 comprising actuator grid assembly 202 may be removably attached to one or more QR bits 104. For example, actuators 204 comprising actuator grid assembly 202 may be detached from QR bits 104 for the purposes of changing the configuration of QR bit head grid 102. In yet other embodiments, actuators 204 comprising actuator grid assembly 202 may be permanently detached from QR bits 104. However, actuator grid assembly 202 may take any form that allows actuator grid assembly 202 to physically move QR bits 104, transfer energy to or from QR bits 104, or both physically move and transfer energy to or from QR bits 104.

Figure 3B:
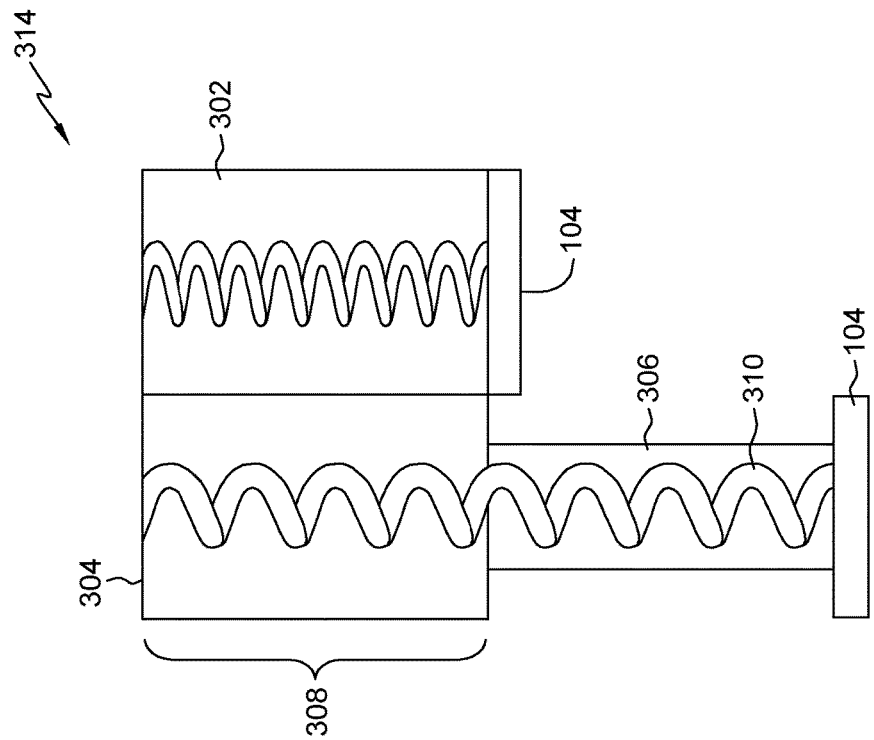
FIG. 3B depicts a heating mechanism contained in an actuator assembly, in accordance with one embodiment of the present invention.
Figure 3A:
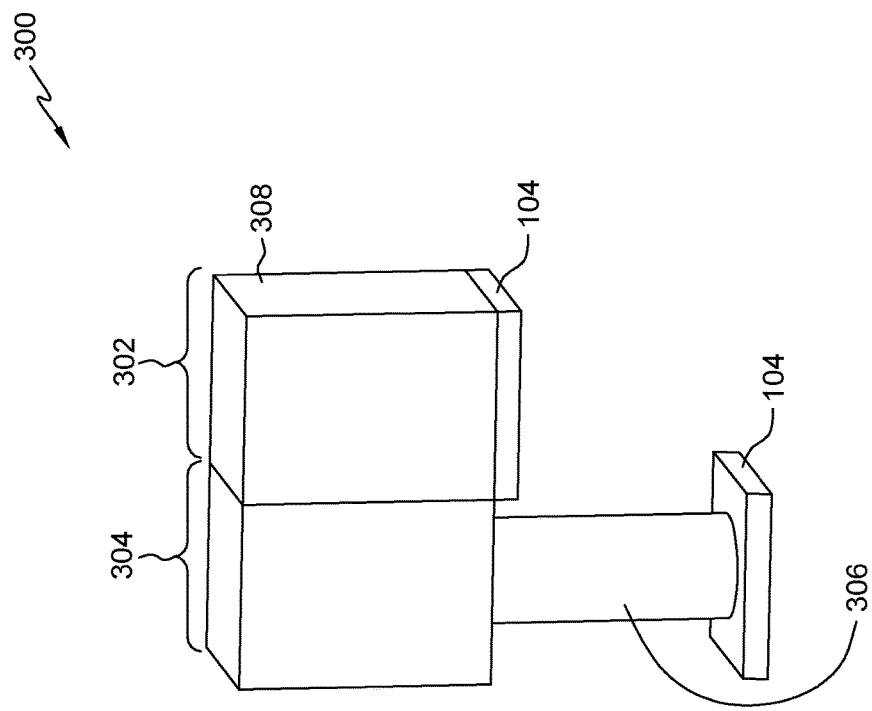
FIG. 3A depicts an actuator assembly, in accordance with one embodiment of the present invention.

FIG. 3A depicts an actuator assembly, in accordance with one embodiment of the present invention. In the depicted embodiment, actuator assembly 300 comprises actuator body 308, piston assembly 306, and QR bit 104. Additionally, actuator assembly 300 is capable of sending and receiving program instructions, such as status data and branding instructions, and changing the configurations of one or more actuators 204 in response to receiving program instructions. Actuator body 308 is adapted to receive and to expel piston assembly 306. In an embodiment, piston assembly 306 is permanently attached to QR bit 104. In yet another embodiment, piston assembly 306 may be any compatible prismlike shape, such as a rectangular prism or a triangular prism. If actuator body 308 and piston assembly 306 are in the expelled configuration, then the configuration comprising the actuator body with expelled piston assembly 306 is engaged actuator 304. If actuator body 308 and piston assembly 306 are in a configuration wherein actuator body 308 receives piston assembly 306, then the configuration comprising the actuator body with received piston assembly 306 is disengaged actuator 302. In another embodiment, actuator body 308 may not be adapted to receive piston assembly 306. Instead, piston assembly 306 is permanently in an expelled configuration with respect to actuator body 308. In yet another embodiment, QR bit 104 may be removably attached to the piston assembly 306. For example, QR bits 104 may take a variety of forms and be attached to one or more piston assemblies 306 to dynamically adapt QR code configurations to particular applications. In yet another embodiment, piston assembly 306 may be removably attached to actuator body 308. For example, piston assembly 306 may take a variety of forms, may be in a variety of shapes, and may be removed and replaced for particular applications such as freeze branding, inductive heat branding, joule branding, and electrical branding. In yet another embodiment, piston assembly 306 may not be present in actuator assembly 300 and may take any form allowing for the transfer of heat to or from actuator body 308 and QR bit 104. For example, the transfer of heat may be transferred to QR bit 104 by a high intensity laser. In another example, the transfer of heat may be from electromagnetic induction.

FIG. 3B depicts an electrical QR bit heating mechanism 314 using a coiled wire, in accordance with one embodiment of the present invention. In the depicted embodiment, actuator body 308 and piston assembly 306 act as a conduit for internal wire 310 which is attached to QR bit 104 to provide electrical heating. Additionally, internal wire 310 is coiled to allow for internal wire 310 to fit inside actuator body 308 and piston assembly 306 in both engaged actuator 304 and disengaged actuator 302 configurations. In another embodiment, internal wire 310 may be any form allowing for internal wire 310 to attach to QR bit 104. In yet another embodiment, actuator assembly 300 may be permanently in the engaged configuration.

FIG. 3C depicts an electromagnetic actuator assembly 316 in accordance with one embodiment of the present invention. In the depicted embodiment, magnetic core 310 is attached to QR bit 104 and surrounded by external coil 312. In the depicted embodiment, magnetic core 310 is made of a ferromagnetic material such as iron. An electromagnetic actuator assembly mechanism allows QR bits 104 to be selectively disengaged from a default engaged state by running a current through external coil 312.

FIG. 4A depicts an inductive QR bit heating element 402, in accordance with one embodiment of the present invention. In the depicted embodiment, actuator body 308, piston assembly 306, and QR bit 104 couple with inductive heating element 402 which is in closest proximity to QR bit 104. In the depicted embodiment, QR bit 104 is a ferromagnetic material allowing inductive heating element 402 to increase the temperature of QR bit 104. In another embodiment, heating element 402 may heat QR bits 104 electrically. In yet another embodiment, piston assembly 306 may be fixed with the actuator assembly 300 permanently in an engaged configuration, such as engaged actuator 304 in FIG. 3B.

FIG. 4B depicts a liquid nitrogen QR bit freeze branding element 404, in accordance with one embodiment of the present invention. In the depicted embodiment, actuator body 308, piston assembly 306, and QR bit 104 couple with liquid nitrogen cooling element 404, which is in closest proximity to QR bit 104. Liquid nitrogen cooling element 404 decreases the temperature of QR bit 104 for use in freeze branding applications, such as branding one or more products. In an embodiment, liquid nitrogen may contact QR bits 104 and lower the temperature of QR bits 104. However, the invention described herein may be cooled by any means available including evaporative heat transfer technologies commonly used in refrigerators.

Figure 4C:
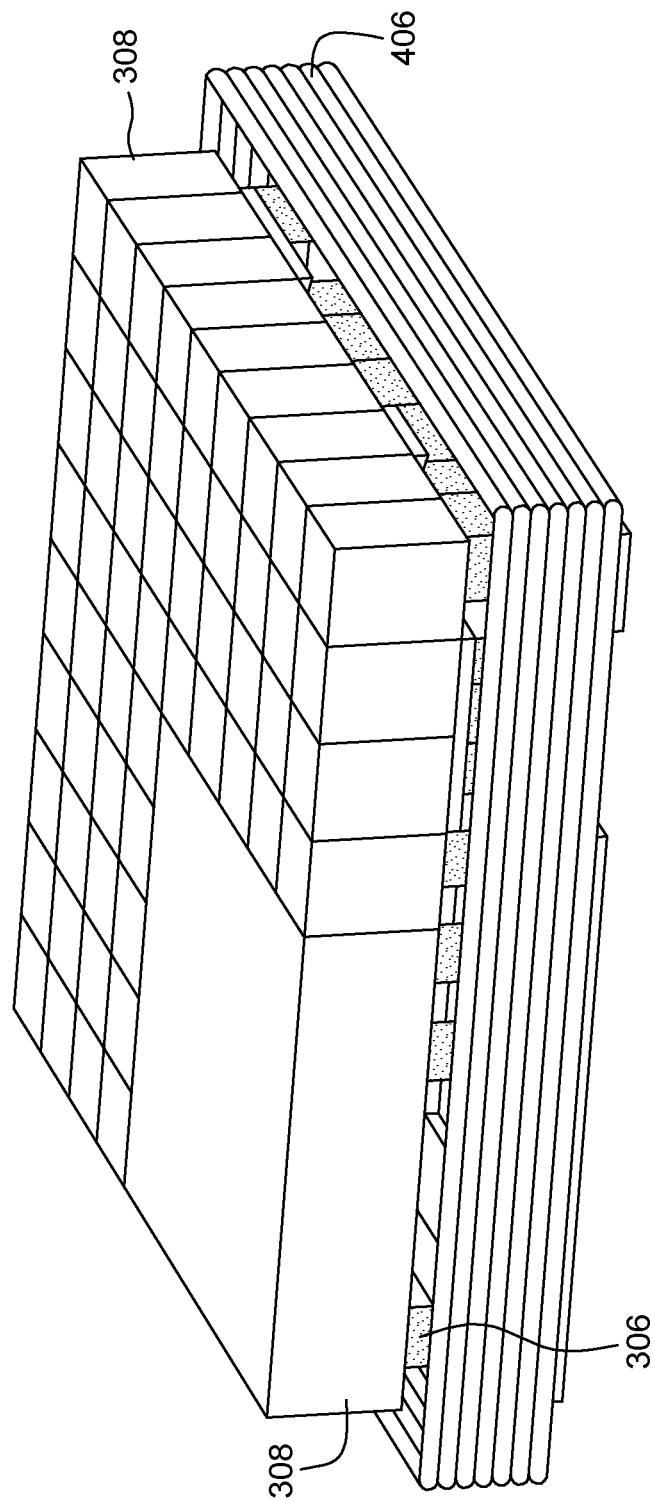
FIG. 4C depicts a resistive heat branding element, in accordance with one embodiment of the present invention.

FIG. 4C depicts a resistive QR bit heating element 406, in accordance with one embodiment of the present invention. In the depicted embodiment, actuator body 308, piston assembly 306, and QR bit 104 couple with resistive heating element 406. Resistive heating element 406 heats up and transfers heat to QR bit 104 for heat branding applications, such as branding food products, wood, and any other material that can be heat branded. For example, resistive heating element 406 may heat up using an electrical heating system. In another embodiment, resistive heating element 406 may heat up using an open flame. However, resistive heating element 406 may heat up QR bits 104 using any heating technique known in the art.

Figure 5:
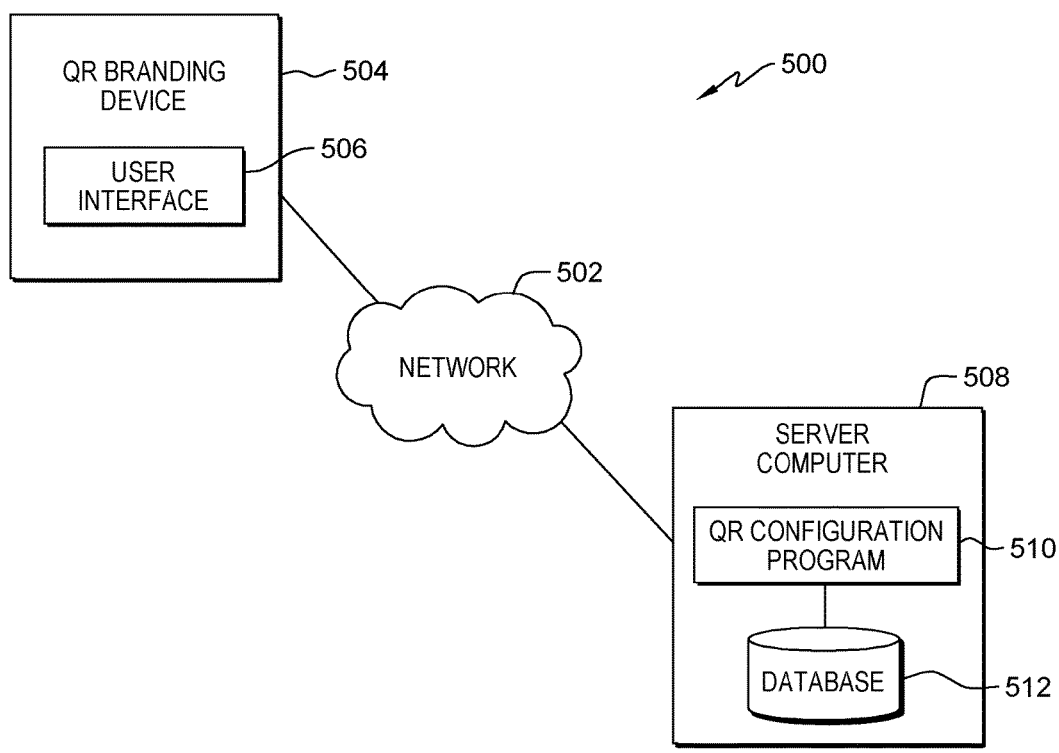
FIG. 5 is a functional block diagram illustrating a distributed data processing environment, in accordance with an embodiment of the present invention.

FIG. 5 is a functional block diagram illustrating a distributed data processing environment, generally designated 500, in accordance with one embodiment of the present invention. The term "distributed" as used in this specification describes a computer system that includes multiple, physically distinct devices that operate together as a single computer system. FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 500 includes QR branding device 504 and server computer 508, all interconnected over network 502. Network 502 can be, for example, a telecommunications network, a local area network (LAN), a wide area network (WAN), such as the Internet, or a combination of the three, and can include wired, wireless, or fiber optic connections. Network 502 can include one or more wired and/or wireless networks that are capable of receiving and transmitting data, voice, and/or video signals, including multimedia signals that include voice, data, and video information. In general, network 502 can be any combination of connections and protocols that will support communications between QR branding device 504 and server computer 508, and other computing devices (not shown) within distributed data processing environment 500.

QR branding device 504 can be a computer, a laptop computer, a tablet computer, a smart phone, or any programmable electronic device capable of communicating with various components and devices within distributed data processing environment 500, via network 502. QR branding device 504 may receive direct input from the user via user interface 506, which may include input for managing supervised learning activities in machine learning applications. For example, a user may input branding parameters based on various categories such as the type of substrate being branded, the minimum darkness of the branded material, and the QR code. QR branding device 504 may represent any programmable electronic device, pre-configured electronic device, or combination of programmable and pre-configured electronic devices capable of executing machine readable program instructions and communicating with other computing devices (not shown) within distributed data processing environment 500 via a network, such as network 502. In an embodiment, QR branding device 504 may be limited to communicating with other computing devices (not shown) within distributed data processing environment 500 via a network, such as network 502. In the depicted embodiment, QR branding device 504 includes an instance of user interface 506. In another embodiment, QR branding device 504 does not include an instance of user interface 506.

User interface 506 provides an interface to QR configuration program 510 on server computer 508 for a user of QR branding device 504. In one embodiment, user interface 506 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 506 may also be mobile application software that provides an interface between a user of QR branding device 504 and server computer 508. Mobile application software, or an "app," is a computer program designed to run on smart phones, tablet computers and other mobile devices. User interface 506 enables the user of QR branding device 504 to register with server computer 508 to adjust preferences for QR branding protocols, such as the temperature, the duration, the method of heating, and configuration of QR bits 104. However, user interface 506 is not limited to the aforementioned examples and may be used to control any parameters associated with QR configuration program 510. In yet another embodiment, server computer 508 may include an instance of user interface 506.

Server computer 508 can be a standalone computing device, a management server, a web server, a mobile computing device, or any other electronic device or computing system capable of receiving, sending, and processing data. In other embodiments, server computer 508 can represent a server computing system utilizing multiple computers as a server system, such as in a cloud computing environment. In another embodiment, server computer 508 can be a laptop computer, a tablet computer, a netbook computer, a personal computer (PC), a desktop computer, a personal digital assistant (PDA), a smart phone, or any other programmable electronic device capable of communicating with QR branding device 504 and other computing devices (not shown) within distributed data processing environment 500 via network 502. For example, server computer 508 may be a smart phone that is capable of remotely controlling and sending registration and configuration data to QR branding device 504. In another embodiment, server computer 508 represents a computing system utilizing clustered computers and components (e.g., database server computers, application server computers, etc.) that act as a single pool of seamless resources when accessed within distributed data processing environment 500. In the depicted embodiment, server computer 508 includes QR configuration program 510 and database 512. Server computer 508 may include internal and external hardware components, as depicted and described in further detail with respect to FIG. 7.

QR configuration program 510 executes a series of steps to send configuration parameters to QR branding device 504 to configure the QR bit head grid 102 for particular branding applications. QR configuration program 510 receives one or more QR configuration parameters. QR configuration program 510 determines one or more program instructions to achieve QR configuration parameters. QR configuration program 510 sends the one or more program instructions to a branding device, such as QR branding device 504. QR configuration program 510 receives status data associated with QR branding device 504. If the QR branding device status data does not meet the one or more QR configuration parameters, then QR configuration program 510 adjusts one or more program instructions. Following the adjustment of the one or more program instructions, QR configuration program 510 sends the adjusted program instructions to QR branding device 504. If QR branding device 504 status data meets the one or more QR configuration parameters, then QR configuration program 510 performs one or more actions. Actions may include removing the branded substrate and replacing the branded substrate with an unbranded substrate, sending the branded substrate to the next apparatus, recording data about QR branding device 504, and/or recording data about the substrate on database 512. However, actions may include any action relevant to the application at hand, such as any action involved in the continuation or completion of the QR branding process.

Database 512 is a repository for data used by QR configuration program 510. In the depicted embodiment, database 512 resides on server computer 508. In another embodiment, database 512 may reside elsewhere within distributed data processing environment 500 provided QR configuration program 510 has access to database 512. Database 512 can be implemented with any type of storage device capable of storing data and configuration files that can be accessed and utilized by server computer 508, such as a database server, a hard disk drive, or a flash memory. In some embodiments, database 512 may store any data that QR configuration program 510 uses to determine one or more program instructions based on QR configuration parameters and sends to QR branding device 504 to execute the one or more program instructions. For example, database 512 may store parameters set by a user for use by QR configuration program 510. In various embodiments, database 512 may store data received by QR configuration program 510 and registration information including configuration data of QR configuration program 510 and QR branding device 504.

Figure 6:
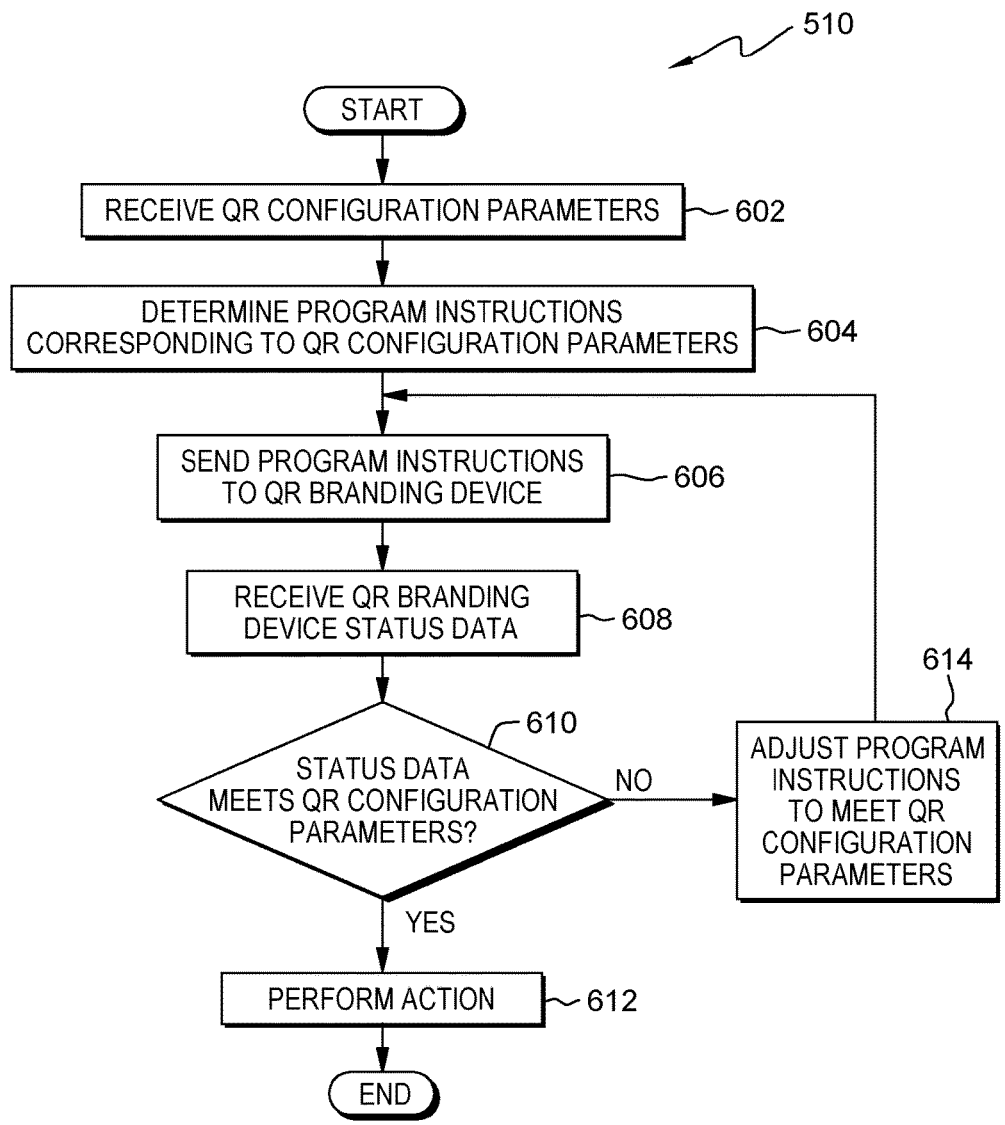
FIG. 6 is a flowchart depicting operational steps of a dynamic quick response code configuration program, on a server computer within the distributed data processing environment of FIG. 1, for determining and executing branding parameters, in accordance with an embodiment of the present invention.

FIG. 6 depicts operational steps for receiving QR configuration parameters for QR branding applications and sending program instructions to QR branding device 504 within the computing environment of FIG. 5, in accordance with an embodiment of the present invention. The operational steps of FIG. 6 begin when QR configuration program 510 receives QR configuration parameters. FIG. 6 as described herein is based on the operational steps of QR configuration program 510 located outside of QR branding device 504. However, alternative embodiments and configurations may execute the operational steps of QR configuration program 510. In some embodiment, QR configuration program 510 may operate inside of QR branding device 504.

QR configuration program 510 receives one or more configuration parameters (step 602). Configuration parameters may include any combination of variables required to brand a QR code using a temperature difference between QR bits 104 and the substrate. Variables may include the temperature of a heating or cooling element, the QR bit 104 configurations, the heating method, the cooling method, the identification of the substrate being branded, darkness or lightness of the branded QR code, the length of branding time, and the position of actuators 204. However, the variables are not limited to the embodiments disclosed herein and may be any variables associated with QR branding techniques. The substrate may be any material that can be branded. A substrate may be cloth, leather, metal, wood, fur, plastic, animal hide, plant material, food products, or any combination of the listed substrates. However, the substrates are not limited to the materials listed herein. In an embodiment, the one or more configuration parameters include the temperature, the QR bit configuration, and the length of branding time. For example, QR configuration program 510 may receive configuration parameters to engage a specific configuration of actuators 204 after heating QR bits 104 to a temperature of 700 degrees Fahrenheit and keep actuators 204 engaged to contact a leather substrate for five seconds. In another example, QR configuration program 510 may receive configuration parameters to engage a specific configuration of actuators 204 after cooling QR bits 104 to a temperature of −300 degrees Fahrenheit and keep the actuators 204 engaged to freeze brand a particular substrate for five seconds.

QR configuration program 510 determines one or more executable program instructions to achieve the one or more configuration parameters (step 604). In an embodiment, QR configuration program 510 may translate the received one or more configuration parameters to machine readable instructions by identifying the actuators 204 designated labels, such as the identifier for a particular actuator 204, in the program, communicating the desired temperature to a heating/cooling element, and engaging actuators 204 for a designated amount of time based on task-specific factors. Task-specific factors may include substrate properties, particular branding applications, and acceptable margins of error. Task-specific factors may be derived by QR configuration program 510 based on the task inputted by a user of QR branding device 504 in the form of configuration parameters. For example, QR configuration program 510 may translate user-inputted configuration parameters requiring a particular QR code configuration to be branded into a particular type of leather at a rate of 100 per hour with a minimum level of light absorption (i.e., how dark the QR code is on the substrate) into a set of executable program instructions that instruct actuator grid 202 to change the configuration of particular actuators 204 to an engaged actuators 304, instruct resistive heating element 406 to increase the output energy to 533.15 Kelvin, and instruct actuator grid 202 to keep engaged actuators 304 engaged for five seconds. As a result, the set of executable program instructions will achieve the configuration parameters for task-specific factors such as the amount of energy required to change the molecular structure of the particular type of leather, the amount of time required to brand the leather to the desired darkness, and the amount of time allowed between consecutive brands. In another embodiment, QR configuration program 510 may use supervised learning classifiers to analyze substrates and the amount of brands to be completed per hour to determine task-specific factors, such as factors associated with specific types of substrates, based on labeled training examples to categorize the relationship between the substrate and the configuration parameters. For example, QR configuration program 510 may identify a substrate as a particular type of leather and determine that leather falls into a category of heat branding requiring QR bits 104 to be at least 500 degrees Fahrenheit for a minimum of five seconds in order to complete 100 brands per hour and allow for sufficiently quick reheating between brands.

QR configuration program 510 sends the one or more executable program instructions to a QR branding device 504 (step 606). In one embodiment, QR configuration program 510 may send executable program instructions via network 502. For example, a user may input configuration parameters into a laptop computer containing QR configuration program 510 which will subsequently send the executable program instructions associated with the input configuration parameters over network 502 to QR branding device 504. Configuration parameters may include instructions to engage one or more QR bits 104 from a disengaged configuration. In another embodiment, configuration parameters may instruct electromagnetic actuator assembly 316, discussed with respect to FIG. 3C, to disengage one or more QR bits 104 from an engaged configuration. For example, QR configuration program 510 may send program instructions to run a current through external coil 312 creating a magnetic field on magnetic core 310 to pull a corresponding QR bit 104 away from the substrate and the pattern to be branded remains nearest to the substrate for branding applications. As a result, QR configuration program 510 causes electromagnetic actuator assembly 316 to selectively disengage particular actuators 204 to create a desired QR code pattern in a freeze branding application. As actuators 204 disengage, QR bits 104 attached to actuators 204 disengage and the remaining engaged QR bits 104 freeze brand some material. In other embodiments, QR bits 104 in electromagnetic actuator assembly 316 may be keyed on the side further away from the substrate to prevent rotation. In yet other embodiments, each QR bit 104 in QR bit head grid 102 may be individually shielded from other QR bits 104 to prevent electromagnetic forces from acting upon neighboring QR bits 104.

In yet another embodiment, QR configuration program 510 may reside on QR branding device 504 and a user may input configuration parameters through user interface 506. For example, a user may directly input configuration parameters, such as the branding time, temperature, and QR bits 104 configuration, using a keyboard and mouse onto a computer connected to QR bit head grid 102.

QR configuration program 510 receives status data associated with the QR branding device 504 (step 608). Status data may be any information associated with QR branding device 504 and the general branding process. Status data may include the engaged or disengaged state of actuators 204, the temperature of post-brand QR bits 104, the temperature of a heating/cooling element, and the length of brand time. In an embodiment, QR configuration program 510 may receive status data pertaining to the state of actuators 204, the length of time actuators 204 were engaged, the temperature of QR bits 104, and the temperature of resistive heating element 406. For example, QR configuration program 510 may receive status data indicating that actuators 204 contacted the substrate, such as leather, for ten seconds, the temperature of the post-brand QR bits 104 are ten degrees below the designated temperature of 500 degrees Fahrenheit, and the temperature of resistive heating element 406 is 500 degrees Fahrenheit. In another embodiment, QR configuration program 510 may receive status data pertaining to the engaged and/or the disengaged state of actuators 204, the length of time actuators 204 were engaged, the temperature of QR bits 104, and the temperature of liquid nitrogen cooling element 404. For example, QR configuration program 510 may receive status data indicating that actuators 204 contacted the substrate for ten seconds, the temperature of the post-brand QR bits 104 are ten degrees above the designated temperature of −300 degrees Fahrenheit, and the temperature of liquid nitrogen cooling element 404 is −300 degrees Fahrenheit.

QR configuration program 510 determines that the status data associated with QR branding device 504 meets the one or more QR configuration parameters ("Yes" branch, decision block 610). QR configuration program 510 may determine that the status data indicates that QR branding device 504 meets the received QR configuration parameters and, as a result, branded the substrate correctly. In an embodiment, QR configuration program 510 receives status data indicating that the temperature of the QR bits 104 dropped by a sufficient number of degrees and that the correct actuators 204 engaged for a sufficient amount of time required to achieve the configuration parameters thereby allowing QR configuration program 510 to determine that the QR branding device 504 achieved the configuration parameters. For example, QR configuration program 510 may receive status data that indicates that the temperature of QR bits 104 dropped by ten degrees Fahrenheit and that engaged actuators 304 were in an expelled configuration for five seconds. As a result, QR configuration program 510 may calculate that the drop in temperature of QR bits 104 means that sufficient energy transferred to brand the substrate and the amount of time that actuators 204 were in an expelled configuration as well as the drop in temperature of QR bits 104 indicates physical contact with the substrate for five seconds. The transfer of energy based on changes in temperature may be calculated using thermodynamic principles of advection, conduction, convection, and radiation in a thermodynamic system based off the materials present in the system. Different materials have known thermodynamic properties. For example, iron, steel, air at 32 degrees Fahrenheit, and dry leather have thermal conductivities of 79.5, 50.2, 0.024, and 0.14 Watts per meter Kelvin, respectively. The thermodynamic algorithms associated with the calculation of energy transfer may be input into the system by a user and modified depending on the application, such as when the substrate changes. QR branding device 504 may optionally contain a QR code reader to scan the branded QR code and relay the result to QR configuration program 510 to confirm a successful brand.

QR configuration program 510 determines that status data associated with QR branding device 504 does not meet the one or more QR configuration parameters ("No" branch, decision block 610). In an embodiment, QR configuration program 510 receives status data indicating that the temperature of the QR bits 104 dropped by an insufficient number of degrees and that not all of the designated actuators 204 engaged for a sufficient amount of time required to achieve the configuration parameters thereby allowing configuration program 510 to determine that the QR branding device 504 failed to achieve the configuration parameters. For example, QR configuration program 510 may receive status data that indicates that the temperature of QR bits 104 dropped by six degrees Fahrenheit and that some of the designated engaged actuators 304 were in an expelled configuration for three seconds. As a result, QR configuration program 510 may calculate that the drop in temperature of QR bits 104 means that insufficient energy transferred to brand the substrate, the amount of time that actuators 204 were in an expelled configuration as well as the drop in temperature of QR bits 104 indicates physical contact with the substrate for an insufficient period of time, and the failure to engage some actuators 204 to achieve the QR code configuration. In other embodiments, QR configuration program 510 may receive status data indicating that one of a plurality of configuration parameters executed incorrectly and may therefore determine that QR branding device 504 did not meet one or more QR configuration parameters. In yet another embodiment, QR configuration program 510 may check for a minimum threshold of allowable error that produces a readable QR code. QR branding device 504 may optionally contain a QR code reader to scan the branded QR code and relay the result to QR configuration program 510 to confirm a successful brand.

If the status data associated with QR branding device 504 does not meet the one or more QR configuration parameters ("No" branch, decision block 610), then QR configuration program 510 adjusts one or more executable program instructions (step 614). In an embodiment, QR configuration program 510 adjusts the one or more machine readable instructions to instruct QR branding device 504 to engage one or more previously disengaged actuators 302 and increase the temperature of a heating element. For example, QR configuration program 510 may instruct actuator grid 202 via QR branding device 504 to change the configuration of particular actuators 204 that failed to engage, instruct resistive heating element 406 to increase the output energy by 75 Kelvin, and instruct actuator grid 202 to keep previously disengaged actuators 302 engaged for five seconds. In another embodiment, QR configuration program 510 adjusts the one or more machine readable instructions to instruct QR branding device 504 to engage one or more previously disengaged actuators 302 and decrease the temperature of a cooling element. For example, QR configuration program 510 may instruct actuator grid 202 to change the configuration of particular actuators 204 that failed to engage, instruct liquid nitrogen cooling element 404 to decrease thermal energy of the system by 75 Kelvin, and instruct actuator grid 202 to keep previously disengaged actuators 302 engaged for five seconds.

After adjusting the one or more executable program instructions (step 614), QR configuration program sends the one or more adjusted executable program instructions to QR branding device 504 (step 606). In one embodiment, QR configuration program 510 may send the adjusted executable program instructions via network 502. QR configuration program 510 may send the adjusted executable program instructions meeting the input configuration parameters over network 502 QR branding device 504. In another embodiment, QR configuration program 510 may reside on QR branding device 504 and QR configuration program may send the adjusted executable program instruction through a hardware interface. For example, QR configuration program 510 may be hardwired to QR branding device 504 and send the adjusted executable program instructions directly through its circuitry.

If the status data associated with QR branding device 504 meets the one or more QR configuration parameters, then QR configuration program 510 performs an action (step 612). In one embodiment, QR configuration program 510 performs the action of sending instructions to raise engaged actuators 304 to a disengaged state. For example, if QR configuration program 510 determines that a piece of leather is branded correctly, then QR configuration program 510 halts the branding process by sending instructions to QR branding device 504 to return actuators 204 to a disengaged state. In another embodiment, QR configuration program 510 sends instructions to QR branding device 504 to return engaged actuators 304 to a disengaged state and also sends program instructions to one or more devices (not shown) to place the next substrate under QR branding device 504 for branding. For example, if QR configuration program 510 determines that a first material is freeze branded correctly, then QR configuration program 510 sends program instructions to one or more devices (not shown) to return engaged actuators 304 to a disengaged state and place another product of the first material under QR branding head 504 for freeze branding.

After QR configuration program 510 performs an action, QR configuration program 510 ends. In another embodiment, QR configuration program 510 may not end and may receive new QR configuration parameters. In yet another embodiment, QR configuration program 510 may not end and may send program instructions to QR branding device 504 to continue the branding process. For example, QR configuration program 510 may send program instructions to freeze brand the same QR code as previously branded on the further products.

Figure 7:
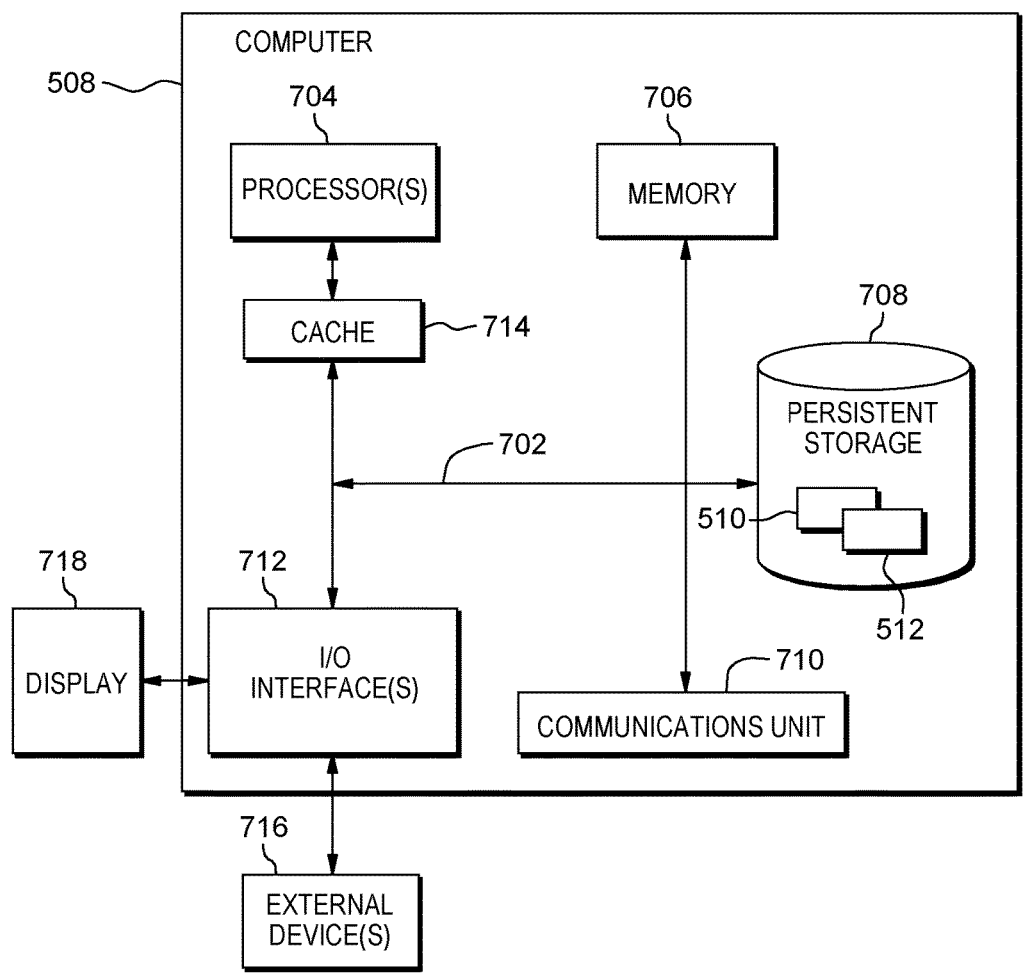
FIG. 7 depicts a block diagram of components of the server computer executing the dynamic quick response code configuration program within the distributed data processing environment of FIG. 5, in accordance with an embodiment of the present invention.

FIG. 7 depicts a block diagram of components of server computer 508 within distributed data processing environment 500 of FIG. 5, in accordance with an embodiment of the present invention. It should be appreciated that FIG. 7 provides only an illustration of one implementation and does not imply any limitations with regard to the environments in which different embodiments can be implemented. Many modifications to the depicted environment can be made.

Server computer 508 can include processor(s) 704, cache 714, memory 706, persistent storage 708, communications unit 710, input/output (I/O) interface(s) 712 and communications fabric 702. Communications fabric 702 provides communications between cache 714, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM). In general, memory 706 can include any suitable volatile or non-volatile computer readable storage media. Cache 714 is a fast memory that enhances the performance of processor(s) 704 by holding recently accessed data, and data near recently accessed data, from memory 706.

Program instructions and data used to practice embodiments of the present invention, e.g., QR configuration program 510 and database 512, are stored in persistent storage 708 for execution and/or access by one or more of the respective processor(s) 704 of server computer 508 via cache 714. In this embodiment, persistent storage 708 includes a magnetic hard disk drive. Alternatively, or in addition to a magnetic hard disk drive, persistent storage 708 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices, including resources of QR branding device 504. In these examples, communications unit 710 includes one or more network interface cards. Communications unit 710 may provide communications through the use of either or both physical and wireless communications links. QR configuration program 510, database 512, and other programs and data used for implementation of the present invention, may be downloaded to persistent storage 708 of server computer 508 through communications unit 710.

I/O interface(s) 712 allows for input and output of data with other devices that may be connected to server computer 508. For example, I/O interface(s) 712 may provide a connection to external device(s) 716 such as a keyboard, a keypad, a touch screen, a microphone, a digital camera, and/or some other suitable input device. External device(s) 716 can also include portable computer readable storage media such as, for example, thumb drives, portable optical or magnetic disks, and memory cards. Software and data used to practice embodiments of the present invention, e.g., QR configuration program 510 and database 512 on server computer 508, can be stored on such portable computer readable storage media and can be loaded onto persistent storage 308 via I/O interface(s) 712. I/O interface(s) 712 also connect to a display 718.

Display 718 provides a mechanism to display data to a user and may be, for example, a computer monitor. Display 718 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. An apparatus for a reconfigurable quick response code branding assembly capable of receiving and sending program instructions, the apparatus comprising:
an actuator assembly having a continuous sidewall defining an aperture allowing access to the interior of the actuator assembly, wherein the actuator assembly is adapted to receive a piston assembly and capable of executing one or more program instructions;
the piston assembly coupled to the actuator assembly, wherein the piston assembly is slidably disposed in the aperture which allows access to the interior of the actuator assembly and allows adjustments to be carried out substantially along one axis parallel to the continuous interior sidewall of the actuator assembly; and
a bit coupled to the piston assembly, wherein the bit moves substantially along one axis with the piston assembly in response to receiving program instructions associated with task-specific factors.

2. The apparatus of claim 1, wherein:
the actuator assembly is not adapted to receive the piston assembly, and
instead the piston assembly is permanently attached to a side of the actuator assembly closest to the bit.

3. The apparatus of claim 1, wherein:
the actuator assembly is coupled to a motor, wherein the motor controls a position of the piston coupled to the actuator assembly.

4. The apparatus of claim 1, wherein:
the actuator assembly is attached to a proximal end of a wire at a side of the actuator assembly farthest from the bit;
the piston assembly having a first aperture closest to the actuator assembly and a second aperture farthest from the actuator assembly on opposite ends, the first aperture and the second aperture connected by a continuous interior sidewall with respect to an exterior surface of the piston assembly defining an empty space acting as a conduit, wherein the wire enters the continuous interior sidewall through the first aperture and exits through the second aperture farthest from the actuator assembly; and
the bit is attached to a distal end of a wire closest to the bit.

5. The apparatus of claim 1, wherein:
an inductive heating element is coupled to the bit, wherein the inductive heating element allows an electromagnetic transfer of energy to the bit.

6. The apparatus of claim 1, wherein:
a liquid nitrogen cooling element is coupled to the bit, wherein the liquid nitrogen cooling element allows a transfer of energy from the bit.

7. The apparatus of claim 1, wherein:
a resistive heating element is coupled to the bit, wherein the resistive heating element allows a transfer of energy to the bit.

8. The apparatus of claim 1, wherein:
the bit is made of a ferromagnetic material.

9. A method for managing a quick response code branding device, the method comprising:
receiving, by one or more computer processors, one or more quick response code configuration parameters;
determining, by the one or more computer processors, one or more program instructions corresponding to the one or more quick response code configuration parameters based on one or more task-specific factors;
sending, by the one or more computer processors, the one or more program instructions to a quick response code branding device;
receiving, by the one or more computer processors, quick response code branding device status data; and
determining, by the one or more computer processors, whether the quick response code branding device status data meets the one or more quick response code configuration parameters.

10. The method of claim 9, further comprising:
responsive to determining that the quick response code branding device status data does not meet the one or more quick response code configuration parameters, adjusting, by the one or more computer processors, the one or more program instructions to meet the one or more quick response code configuration parameters; and
sending the adjusted one or more program instructions to meet the one or more quick response code configuration parameters to the quick response code branding device.

11. The method of claim 10, wherein the status data are selected from a group consisting of: an engaged state of one or more actuators, a disengaged state of one or more actuators, a temperature of one or more post-branding quick response code bits, a temperature of one or more pre-branding quick response code bits, a temperature of one or more heating elements, a temperature of one or more cooling elements, and a length of branding time.

12. The method of claim 9, further comprising:
responsive to determining that the quick response code branding device status data meets the one or more quick response code configuration parameters, performing, by the one or more computer processors, one or more actions.

13. The method of claim 12, wherein the one or more actions are selected from a group consisting of: removing one or more branded substrates, replacing one or more branded substrates with one or more unbranded substrates, inserting one or more unbranded substrates, sending one or more branded substrates to one or more subsequent apparatuses, recording data associated with one or more branded substrates, recording data associated with one or more unbranded substrates, and recording data associated with one or more quick response code branding devices.

14. The method of claim 9, wherein the one or more quick response code configuration parameters are selected from a group consisting of: a temperature of one or more heating elements, a temperature of one or more cooling elements, one or more quick response code bit configurations, one or more heating methods, one or more cooling methods, an identification of one or more substrates, the darkness of one or more branded quick response codes, the lightness of one or more branded quick response codes, and a length of branding time.

15. A computer program product for managing a quick response code branding device, the computer program product comprising:
one or more computer readable storage devices and program instructions stored on the one or more computer readable storage devices, the stored program instructions comprising:
program instructions to receive one or more quick response code configuration parameters;
program instructions to determine one or more program instructions corresponding to the one or more quick response code configuration parameters based on one or more task-specific factors;
program instructions to send the one or more program instructions to a quick response code branding device;
program instructions to receive quick response code branding device status data; and
program instructions to determine whether the quick response code branding device status data meets the one or more quick response code configuration parameters.

16. The computer program product of claim 15, further comprising:
responsive to determining that the quick response code branding device status data does not meet the one or more quick response code configuration parameters, program instructions to adjust the one or more program instructions to meet the one or more quick response code configuration parameters; and
program instructions to send the adjusted one or more program instructions to meet the one or more quick response code configuration parameters to the quick response code branding device.

17. The computer program product of claim 16, wherein the status data are selected from a group consisting of: an engaged state of one or more actuators, a disengaged state of one or more actuators, a temperature of one or more post-branding quick response code bits, a temperature of one or more pre-branding quick response code bits, a temperature of one or more heating elements, a temperature of one or more cooling elements, and a length of branding time.

18. The computer program product of claim 15, further comprising:
responsive to determining that the quick response code branding device status data meets the one or more quick response code configuration parameters, program instructions to perform one or more actions.

19. The computer program product of claim 18, wherein the one or more actions are selected from a group consisting of: removing one or more branded substrates, replacing one or more branded substrates with one or more unbranded substrates, inserting one or more unbranded substrates, sending one or more branded substrates to one or more subsequent apparatuses, recording data associated with one or more branded substrates, recording data associated with one or more unbranded substrates, and recording data associated with one or more quick response code branding devices.

20. The computer program product of claim 15, wherein the one or more quick response code configuration parameters are selected from a group consisting of: a temperature of one or more heating elements, a temperature of one or more cooling elements, one or more quick response code bit configurations, one or more heating methods, one or more cooling methods, an identification of one or more substrates, the darkness of one or more branded quick response codes, the lightness of one or more branded quick response codes, and a length of branding time.

* * * * *